United States Patent
Wilson Arvanitakis et al.

(10) Patent No.: US 12,473,658 B2
(45) Date of Patent: Nov. 18, 2025

(54) POWER CONVERSION SYSTEMS AND METHODS

(71) Applicant: TegIPco, LLC, Dover, DE (US)

(72) Inventors: Nicholas Joseph Wilson Arvanitakis, Cochise, AZ (US); Chrisanthos Arvanitakis, Cochise, AZ (US); Brad Peeters, Cochise, AZ (US); Nick Martin, Cochise, AZ (US); Chad Collins, Cochise, AZ (US)

(73) Assignee: TegIPco, LLC, Dover, DE (US)

( * ) Notice: Subject to any disclaimer, the term of this patent is extended or adjusted under 35 U.S.C. 154(b) by 0 days.

(21) Appl. No.: 18/814,528

(22) Filed: Aug. 25, 2024

(65) Prior Publication Data
US 2025/0250702 A1 Aug. 7, 2025

Related U.S. Application Data

(60) Provisional application No. 63/548,963, filed on Feb. 2, 2024.

(51) Int. Cl.
| | |
|---|---|
| C25B 15/02 | (2021.01) |
| C25B 1/02 | (2006.01) |
| C25B 9/65 | (2021.01) |
| H02M 3/158 | (2006.01) |

(52) U.S. Cl.
CPC ............... *C25B 15/02* (2013.01); *C25B 1/02* (2013.01); *C25B 9/65* (2021.01); *H02M 3/158* (2013.01)

(58) Field of Classification Search
CPC .... C25B 1/02; C25B 1/04; C25B 9/65; C25B 9/66
See application file for complete search history.

(56) References Cited

U.S. PATENT DOCUMENTS

| | | | |
|---|---|---|---|
| 4,663,004 A | * | 5/1987 | Switzer ............... C25B 15/00 205/450 |
| 8,540,962 B2 | | 9/2013 | Kodama |
| 9,636,358 B2 | | 5/2017 | Satoh |
| 10,113,122 B2 | | 10/2018 | Zheng |
| 10,174,260 B2 | | 1/2019 | Iversen |
| 10,214,820 B2 | | 2/2019 | Koeneman |
| 10,322,932 B2 | | 6/2019 | Gu |

(Continued)

FOREIGN PATENT DOCUMENTS

CN 116599093 * 8/2023 ............... H02J 3/28

OTHER PUBLICATIONS

Non-Final Office Action posted Jun. 4, 2025 for related U.S. Appl. No. 19/059,557.

*Primary Examiner* — Ciel P Contreras
(74) *Attorney, Agent, or Firm* — Chris Tanner; BlueCollarIP.com

(57) ABSTRACT

Various embodiments and methods of operation and configuring of power converters for providing a controlled amount of AC output current even as a particular load may at times approach zero resistance are disclosed. The power converters are configured to tolerate a near-short or full-short circuit load for a brief time, without disabling or tripping any safety-interrupts. The various embodiments are configured to achieve electrical requirements needed for specific chemical reforming processes, such as vaporization of an ionic fluid. The various embodiments unlocks electrolysis using AC power, thereby enabling AC electrolysis in common fluids.

21 Claims, 15 Drawing Sheets

(56) References Cited

U.S. PATENT DOCUMENTS

| | | |
|---|---|---|
| 10,586,993 B2 | 3/2020 | Cheng |
| 11,680,746 B2 | 6/2023 | Allidieres |
| 11,761,097 B2 | 9/2023 | Ballantine |
| 11,761,103 B2 | 9/2023 | Joos |
| 11,767,599 B2 | 9/2023 | Ballantine |
| 11,767,600 B2 | 9/2023 | Dawson |
| 11,926,910 B2 | 3/2024 | Soerensen |
| 11,953,157 B2 | 4/2024 | Allidieres |
| 12,103,849 B2 | 10/2024 | Lugtigheid |
| 12,117,239 B2 | 10/2024 | Takase |
| 2010/0236921 A1* | 9/2010 | Yang .................. C25B 1/04 204/264 |
| 2015/0056528 A1* | 2/2015 | Fahimi ............. H01M 8/0656 422/162 |
| 2016/0326659 A1* | 11/2016 | Chiou ................. C25B 15/02 |
| 2019/0181755 A1* | 6/2019 | Swamy ............. H02M 3/1584 |
| 2020/0091821 A1* | 3/2020 | Sagona ............. H02M 3/1582 |
| 2022/0243871 A1 | 8/2022 | Adkins |
| 2022/0298650 A1* | 9/2022 | Viswanathan ......... C25B 11/04 |
| 2023/0062648 A1 | 3/2023 | Arevalo |
| 2023/0341180 A1 | 10/2023 | Huang |
| 2023/0369862 A1* | 11/2023 | Richmond ........... H02J 3/0012 |
| 2024/0383746 A1 | 11/2024 | Arvanitakis |
| 2024/0384420 A1 | 11/2024 | Arvanitakis |

\* cited by examiner

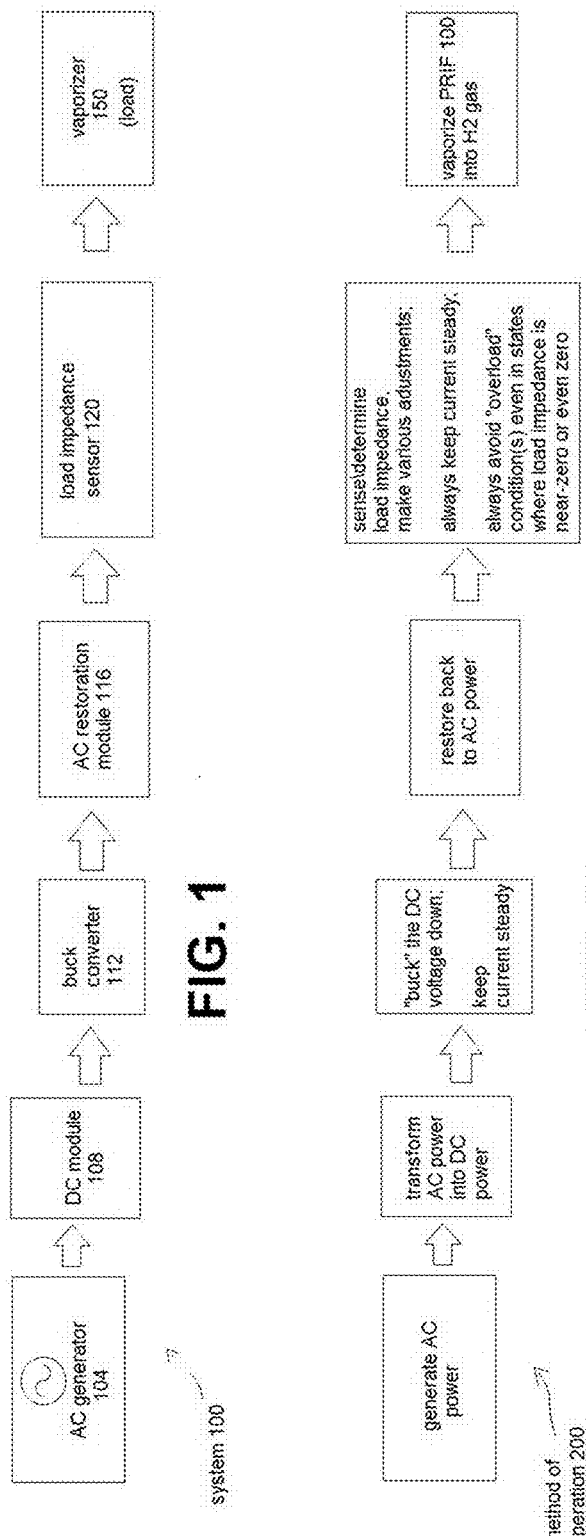

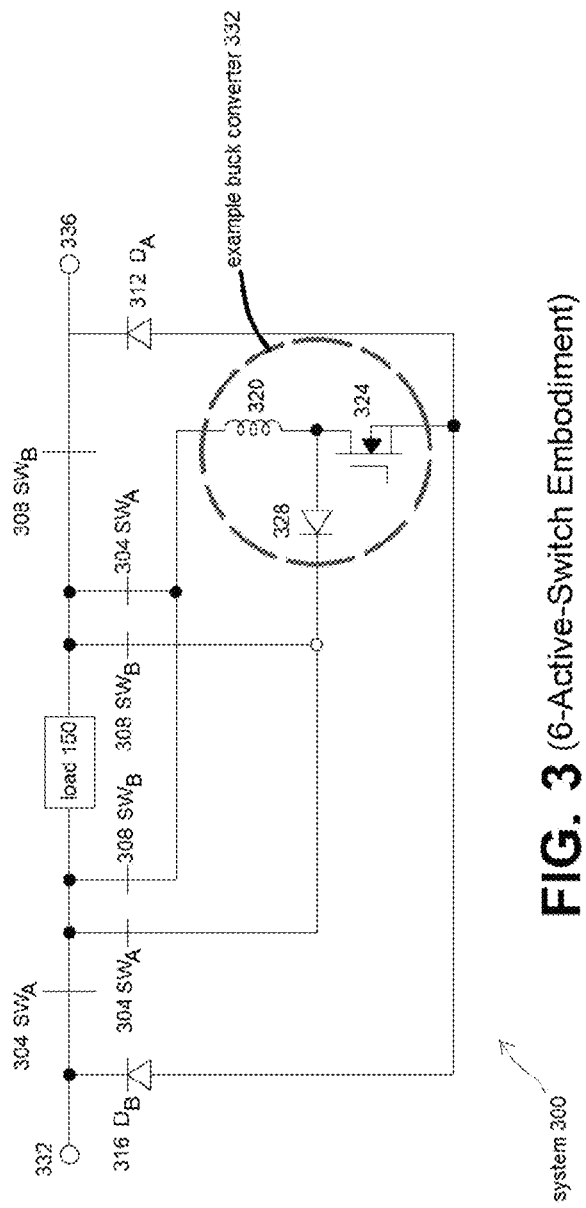
FIG. 3 (6-Active-Switch Embodiment)

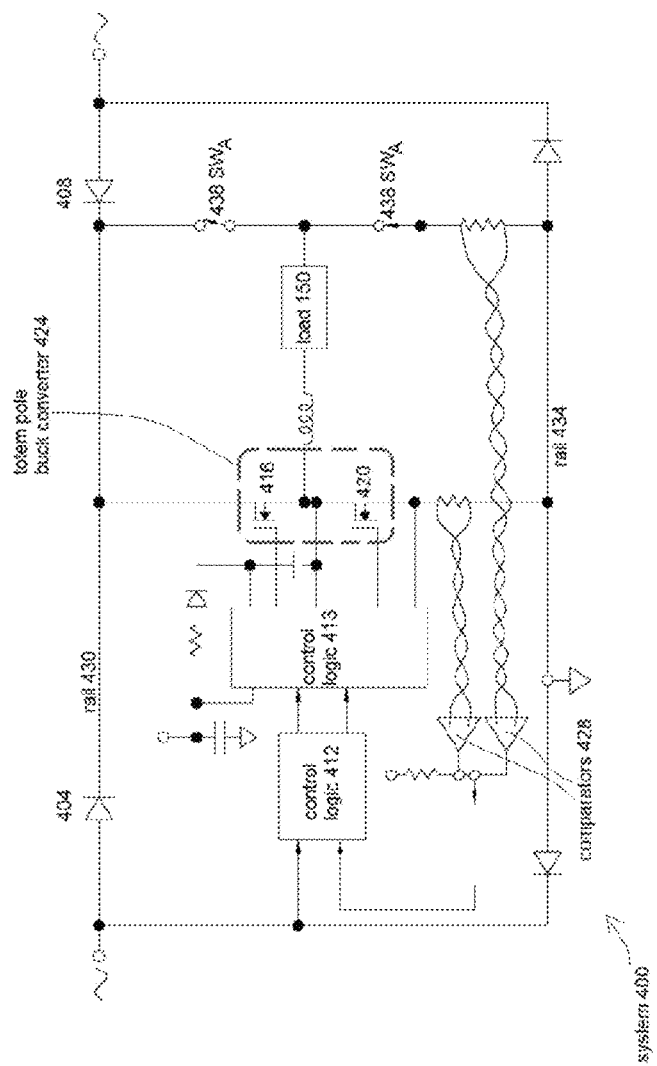
FIG. 4 (4-Active-Switch Embodiment)

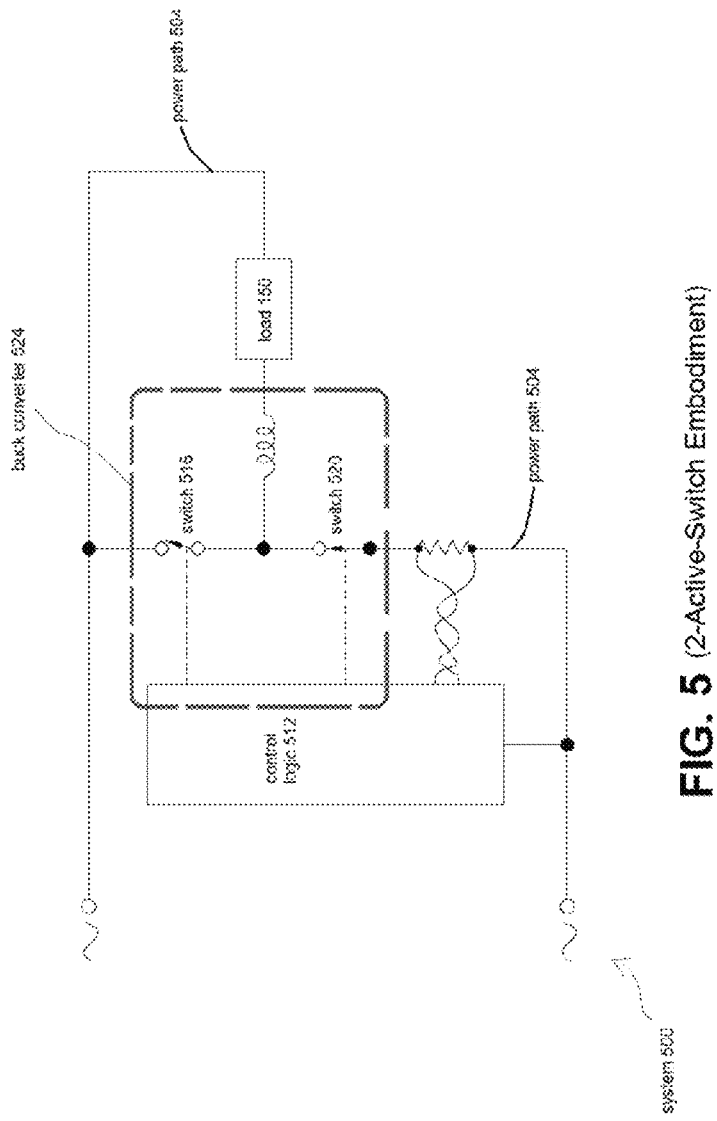
FIG. 5 (2-Active-Switch Embodiment)

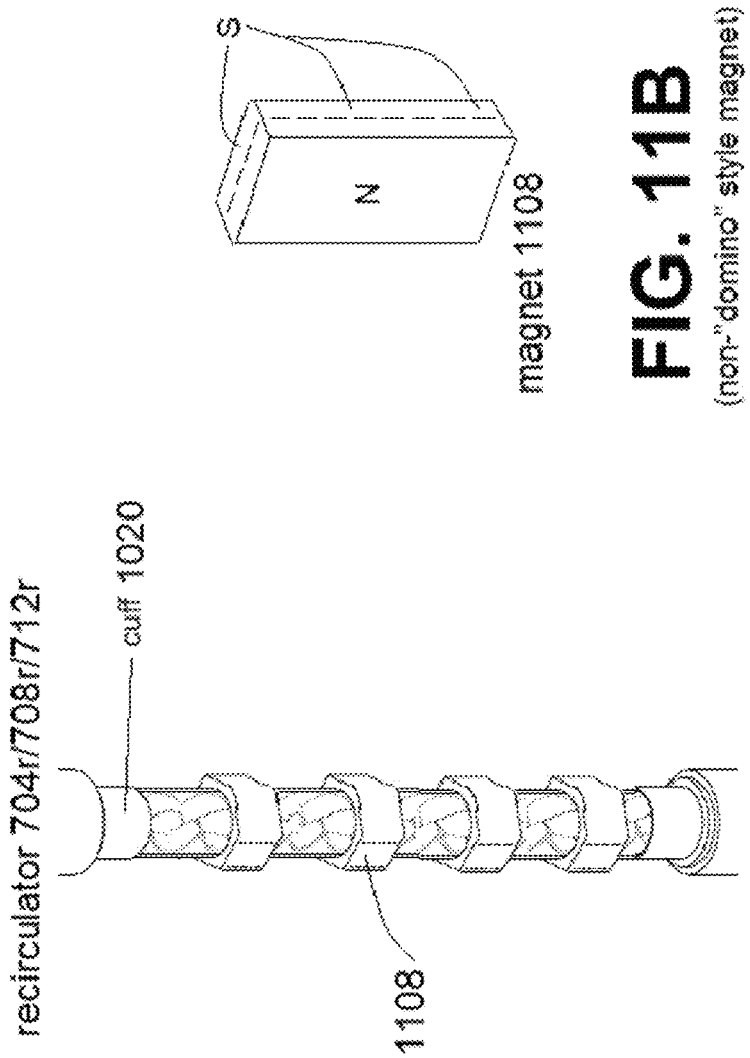

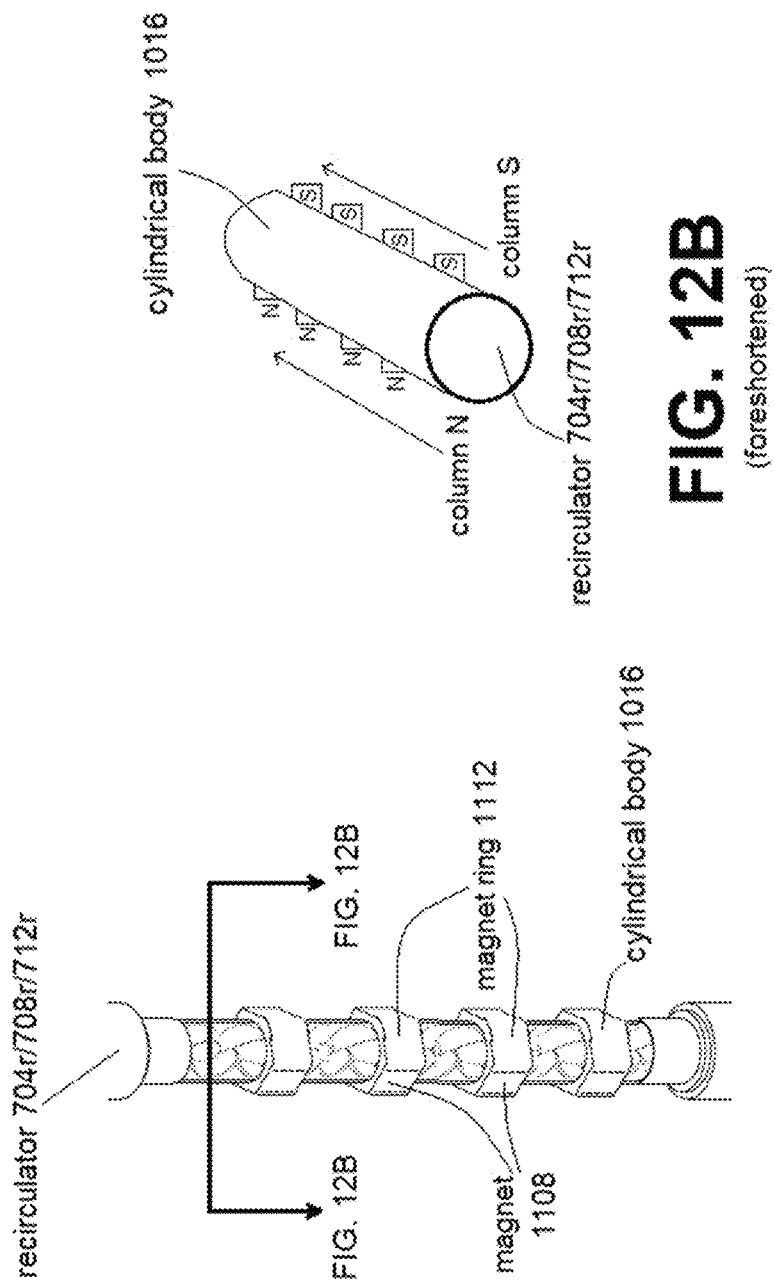

POWER CONVERSION SYSTEMS AND METHODS

CROSS-REFERENCE TO RELATED APPLICATIONS

This disclosure claims priority from and incorporates by reference all subject matter within the U.S. Application No. 63/548,963, filed Feb. 2, 2024. The entire contents of this application are hereby incorporated by reference.

BACKGROUND

Chemical reformers sometimes have problems with aspects of the power being supplied thereto. Extra stages of conversion are sometimes needed. Example conversions can include a step-down transformer.

A conventional approach to implementing a power converter for a target application might involve a PFC (Power Factor Correction) stage, followed by a rectifier, followed by a step-down converter, thereby resulting in a low voltage DC output.

The output of this DC power supply would then need to go through an inverter stage to convert it back into AC. However, there exist difficulties keeping the voltage level low and the current level high. Consequently, an improved power conversion mechanism for use with specific types of chemical reformers is desired.

SUMMARY OF THE INVENTION

The power converter(s) described herein continue to provide a controlled amount of AC output current even as a particular load may at times approach zero resistance. Such a power converter has to tolerate a near-short or full-short circuit load for a brief time, without disabling itself or tripping any safety-interrupt.

The embodiments herein solve this problem using Off The Shelf (OTS) components but in a novel architecture that achieves the peculiar electrical requirements needed for specific chemical reforming processes, such as vaporization of an ionic fluid.

The embodiments herein arose partly from the observation that a final inverter stage would have to be re-thought, including undoing some of the functions of standard upstream circuitry. Reducing stages within a single unified design cancels out the need for some of the components and would present the opportunity for simplification.

Electrolysis only occurs with DC, never AC. All electrolysis is the breaking of covalent bonds, which is expensive. Meanwhile, the PRIF 100 does not require covalent bond breaking, it only requires electron absorption.

Next, AC power is cheaper than DC. It's easier to get more wattage, it's more efficient, and it doesn't require an DC→AC reform. The cheapest way to get raw electrons is AC power. One cannot do normal electrolysis with AC power. Up until now, common electrolytes, either alkaline and or acid based chemistries, can only be electrolyzed with DC power. However, using embodiments of the system 100 unlocks electrolysis with AC power. The embodiments of the system 100 enable AC electrolysis in common fluids.

BRIEF DESCRIPTION OF THE DRAWINGS

FIG. 1 shows an example power conversion system;

FIG. 2 shows an example method for operating the system of FIG. 1;

FIG. 3 shows an example 6-active-switch architecture of a power conversion system;

FIG. 4 shows an example 4-active-switch architecture of a power conversion system;

FIG. 5 shows an example 2-active-switch architecture of a power conversion system;

FIGS. 10, 11A, 11B, 12A, and 12B show detail of recirculators;

DETAILED DESCRIPTION OF PREFERRED EMBODIMENTS

Figure 6:
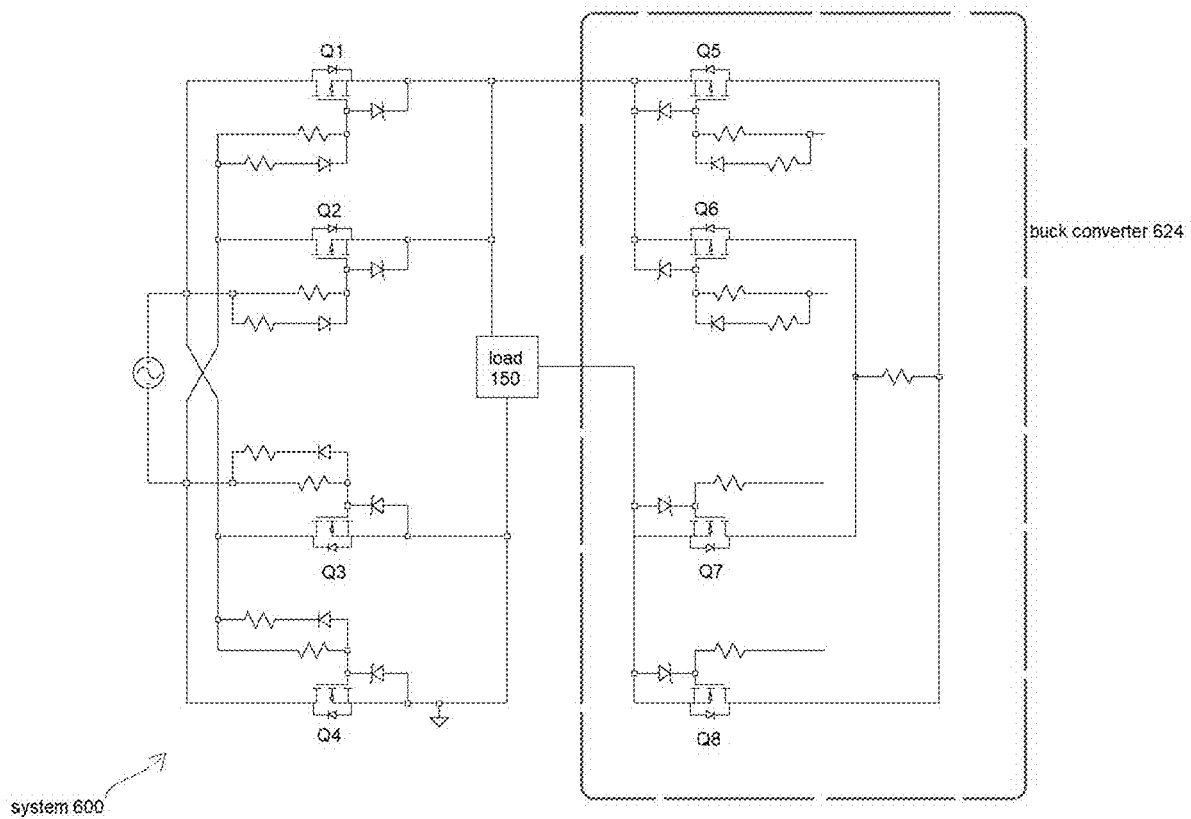
FIG. 6 shows a further embodiment of a power conversion system.

The embodiments herein provide AC electrical power at sustainably high current levels and low voltage levels, suitable for driving a chemical reforming process. The embodiments leverage a variety of configurations of SMPS (Switching Mode Power Supply) technologies in an architecture that eliminates some extra stages of conversion previously thought required in conventional SMPS-design.

The various buck converter(s) discussed herein are surrounded by the minimum necessary circuitry to present the AC input voltage as a DC voltage to the buck converter circuit, then convert the DC output of the buck converter back to the required AC output.

The embodiments herein center around a standard type of SMPS circuit called a "buck converter", so called because it "bucks" a DC input voltage to a lower voltage at its output. The embodiments herein build on that principle, and also increase available DC current at that same output. This alone is counter-intuitive because conventional thinking suggests that as a DC voltage is lowered at an output stage, it is at least plausible that (all other items being equal) the DC current would also be forcibly lowered.

While that might be an initial instinctive reaction, further discussion will show that such a condition is not a requirement and there are ways to design around this assumption.

Accordingly, FIGS. 1-6 describe the embodiments herein regarding the various embodiments of power supplies for use in reactors and vaporizers for chemical transformation. Meanwhile, FIGS. 7-14 describe various details of the reactors which produce a proton-rich ionic fluid, and the vaporizer connected thereto which make use of the various power supplies described herein.

FIGS. 1-2 show a system 100 and a method 200 for operating that system. FIG. 1 shows a rough outline of a layout of the embodiments of the various power conversion system(s) 100\300\400\500\600 herein. It is important to note that both FIGS. 1-2 are in the form of block diagrams, not specific schematics. This is because there exist many workable ways to implement the system 100, of which only some (not all) examples will be presented herein. However, knowing that a person of ordinary skill could implement the system 100 in a variety of ways, this disclosure does not attempt to make an exhaustive and limiting list of all the ways the system 100 could be implemented. Some flexibility is left to the end-designer, depending on availability of components, supply-chain issues, and also the exact nature of the load requiring the specific types of power described herein.

Having stated that, the example-only system 100 comprises an AC generator 104 supplying AC power to a DC conversion module 108, which temporarily converts (another verb might be "disguises") that AC power as DC. That disguised DC power is fed to a buck converter 112, which reduces (bucks down or converts, hence "buck converter") the DC voltage while increasing and stabilizing an amount of DC current passed onto the next stage. This outputted DC is then restored back to its AC format by the AC restoration module 116. The load sensor 120 (AKA load impedance sensor) makes determinations about the load 150, and assists in making adjustments to the system 100 to ensure a steady predictable amount of current regardless of changes in load impedance, and also not shut off or overload in instances of low or zero impedance.

As stated, one purpose of the embodiments herein is to vaporize a proton rich ionic fluid (PRIF) 740 (see FIG. 7), and the PRIF 740 is known to typically have very low impedance. As such, the load 150 at times may routinely have extremely low impedance conditions, or even zero. Even in these circumstances, the various systems 100/300/400/500 and 600 will not shut off or overload despite low or zero impedance.

Three initial embodiments of power conversion systems comprise:
  6-active-switch architecture (FIG. 3);
  4-active-switch architecture (FIG. 4);
  2-active-switch architecture (FIG. 5); and
  a further embodiment in FIG. 6. These embodiments all show a progression towards a goal of minimizing conversions between AC and DC.

FIG. 3 shows a 6-Active-Switch Embodiment of a power conversion system 300. Within FIG. 3, the bar symbols labeled "SW$_A$" and "SWB" represent components that function as electronic switches which conduct in alternating half-cycles of an applied AC line voltage by control circuitry (not shown in FIG. 3) such that, when the left terminal 332 is positive with respect to the right terminal 336, the "SW$_A$" switches 304 are closed and the "SWB" switches 308 are open, and the reverse when the left terminal 332 is negative with respect to the right terminal 336.

Meanwhile, the diode symbols labeled DA 312 and DB 316 conduct passively on the correct half-cycles without the need for control circuitry. The inductor 320, diode 328 and MOSFET 324 symbols are key components of an example SMPS buck converter 332 with some control circuitry not directly shown, for purpose of brevity, clarity, and flexibility. The load 150 remains the same through all drawings, as Applicant's vaporizer mechanisms will not vary regardless of which type of power conversion system is applied thereto.

The concept of duty cycle is relevant to the embodiments herein. One definition of duty cycle is a ratio of time a load or circuit is ON compared to the time the load or circuit is OFF. Duty cycle, sometimes called "duty factor," is expressed as a percentage of ON time. The embodiments herein strive to achieve a duty cycle of 100% or very near.

FIG. 4 shows a 4-Active-Switch embodiment of a power conversion system 400. Specifically, within FIG. 4, two of the active switch elements of FIG. 3 are replaced by the passive diodes 404 and 408. Meanwhile, two of the remaining active switch elements of FIG. 3 are combined with the two switching elements used to comprise the synchronous buck converter 424, in the form of a totem pole arrangement. The line-frequency switching function of the (previous) active switches is achieved by the control logic blocks 412-413, which directs the 2 high-frequency switching MOSFETs 416 and 420. The comparators 428 have a high-speed open collector format.

The power conversion system 400 alternates between a buck converter (MOSFET 416) that "pulls up" with each half-cycle of the applied AC power and buck converted (MOSFET 420) that "pulls down" with the other half-cycle. Accordingly, this is how the duty cycle can be 100%.

Such alternating occurs in coordination with an operation of the two load switches 438 SW$_A$. This way, the load 150 sees AC current even though the rail 430 is always positive and the rail 434 is always negative, thus seemingly more like a DC arrangement.

Finally, the synchronous buck converter 424 is symmetrical. The load switches 438 SW$_A$ connect to opposite sides of the buck converter 424.

FIG. 5 shows a 2-Active-Switch Embodiment of a power control system 500 in a simplified format with some components implied. The PCS 500 of FIG. 5 is a further reduction to simplicity, as the main power path 504 never gets converted to DC. Instead, the main power path 504 remains AC all the way through to the load 150. The system 500 is intentionally simplified in FIG. 5 and leaves out certain detail. For example, the buck converter 524 is partially located within the control logic 512, but not further illustrated by specific discrete electronic components.

Instead, the pivotal features of the system 500 are the high-frequency electronic switches 516 and 520, which must be polarity agnostic, i.e., able to work with AC voltages and currents. The switches 516 and 520 must also operate at high frequencies.

FIG. 6 shows another example power conversion system 600. The system 600 most closely resembles the 6-Active-Switch embodiment 300 shown in FIG. 3, comprising 8 active switches (Q1 thru Q8) surrounding an ordinary SMPS buck converter 624. This is similar to how the system 300 uses 6 active switches and 2 diodes surrounding its buck converter 332. However, within FIG. 6, 4 active switches (Q1 thru Q4) are simply being used as diodes (thus not active switches) in a full-wave rectifier bridge modality. Accordingly, after eliminating switches Q1-Q4 within FIG. 6, the 6 active switches of FIG. 3 are reduced to four authentic switches Q5-Q8 in FIG. 6.

The four active switches Q5-Q8 act as another version of a buck converter 624. This has the effect of actively switching both ends of the load 150 in such a way that the successive DC pulses output from the full-wave rectifier are applied to opposite ends of the load 150, such that the load 150 sees these pulses as AC, even though the pulses are more like DC pulses trying their hardest to act like AC.

Power semiconductor devices need protection circuits, which are called snubber networks, because they have a limited Safe Operating Area (SOA) at turn-on and turn-off transitions. Various testing and tuning was done to optimize the switching speed of the switching transistors and the component values in the surrounding snubber networks.

Additional Depth+Clarifications

The embodiments herein provide an ability to flood (verb) cells with saturated electrons from the A/C source referred to herein. By "flood", this means producing a linear non-waveform function with a monodirectional flow of electrons. These electrons will be used either in nucleation, or be given off in excess heat.

The embodiments herein further give the ability to decrease heat loss and increase proton nucleation by tuning the linear wave forms to a set A/C voltage and A/C current in a monodirectional pathway.

The embodiments herein set a specific voltage and current being delivered into cells (shown in FIGS. 1 and 2 as the load 150). One of numerous purposes is to nucleate and create a hydrogen gas from a specific liquid. As voltage is entering the electrodes, nucleation begins. If nucleation cannot maximize the electron density occurring inside the electrolytic cell, heat will be given off.

For example, if the temperature continues to rise at a rate that is unnecessary, an operator can turn the voltage down or off entirely. Even under these circumstances, nucleation (e.g. turning current density of 5 amps/square centimeter applied to the load 150 to remain at 5 amps/square centimeter, but with less heat) would be happening at the same rate, but with less heat given off. Therefore, one can do gas production with minimal heat given off by making simple adjustments, thereby increasing efficiency.

If the operator completely removes all voltage, of course the current will be removed also. However, if that operator only reduces the voltage a certain amount, the intent for the embodiments herein is for the current to not be reduced, or be reduced only marginally. An operator may achieve this by reading a temperature gauge, but an embodiment exists in which the voltage (not current) is automatically reduced depending on temperature conditions.

Another measurements metric provided by the various PCS herein that is advantageous is measuring current density and making decisions based on current density being applied to the load 150.

The absence of any heat-discharge suggests advantages such as optimization of electron usage, thereby affirming the embodiments are working well. When the embodiments herein are operating and functioning in optimal form, one doesn't get the heat, one just gets the nucleation. Meanwhile, with an inefficient process, temperature goes through the roof.

The power conversion systems 100/300/400/500/600 described herein are configurable so that electrons can be "managed" so as to be used only for nucleation of the PRIF 740, and not be given off as heat. An operator of the various systems 100/300/400/500/600 can watch temperature indicators and take appropriate steps depending on their readings, or this may be automated.

This operator can stabilize their temperature to a set predetermined number that has been pre-decided to be the most efficient for nucleating. If heat starts to occur, an operator (or automated mechanism) can just turn down the voltage. No need to be concerned the current will also decline, it won't. As stated, the embodiments herein provide a way of maintaining steady current levels even where voltage may be changing.

An additional advantage is removing the requirement for complex heat sinks, as AC/DC rectified power usually gives off heat which much be dissipated. Maintaining a linear load inside of semiconductors without the need of an AC/DC power source provides the ability to decrease size, and also decrease cooling necessities e.g. Peltier devices and/or other heat sinks.

The embodiments herein facilitate applying AC to a massive load to achieve liquid to gas conversion, where the specific liquid is the PRIF 740. Even when the load resistance is close to zero, or even at zero, conversion can still occur. The systems described herein will sense and know what to do, and will not overload or trip circuit breakers.

For example-only, an early embodiment of systems 100/300/400/500/600 is 60 volts and 10-12 amps. Possible ranges of the embodiments herein could include 240 volts by 50 amps, which equates to 14,400 Watts. Another embodiment is 240 volts and e.g. 40-42 amps. This is relevant because an ability to stabilize current where the load 150 has no limit, means one can control the amount of amperage per square inch in the load 150 (e.g. a vaporizing chamber).

The various systems herein 100/300/400/500/600 run at a power factor (PF, efficiency of electrons being used in the system) of near 99.99. Power factor is proportional to heat, where excess heat drives the PF down. As shown above, the embodiment herein preserving efficiency by reacting to excess heat, thus assuring a higher power factor.

Again, the various systems herein 100/300/400/500/600 are structured to have a duty cycle of near-100% or 100%.

It is well-known that V=IR. But the reader must avoid over-inducing principles from that known relationship. The various power conversion systems described herein takes out the variable of I (current), which instead stays in a predetermined range e.g. locked in to between 10 and 12 amps. The input voltage can change, but output current will stay stable at 10-12 amps. That is, even if putting excess amounts of volts on the load 150, the current will not go higher than a predetermined level e.g. 12 amps.

Moving in the other direction, even at lower capacities, the current will also never go below a certain limit. Thus the systems described herein act as a current limiting device, but also a current-guaranteeing device (down to a certain point).

This completes the discussion of power conversion systems 100/300/400/500/600.

Figure 7A:
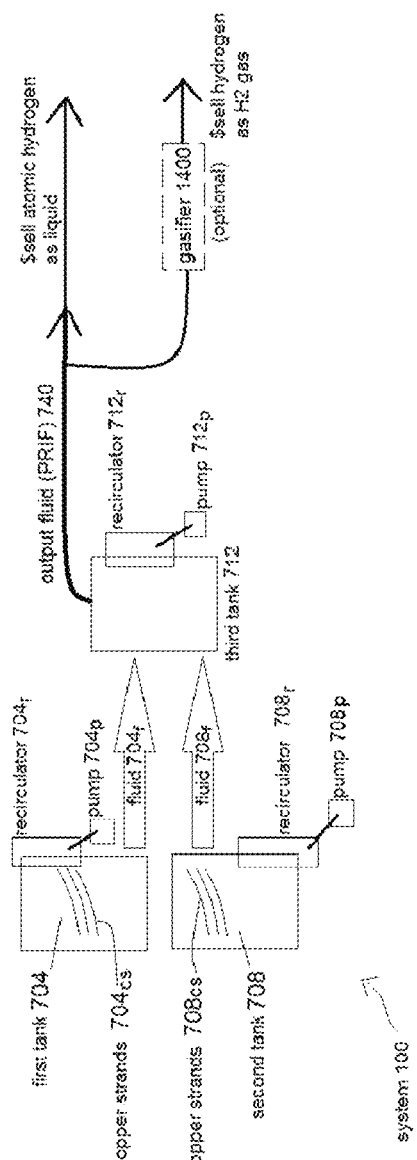
FIGS. 7A-7B show example systems for producing proton-rich output fluid.

FIG. 7A shows an example system 700 for producing the proton-rich output fluid 740. The system 700 converts a common hydrogen-based input fluid 701 to the output fluid 740 comprising an overabundance of hydrogen $H_1$ atoms, mainly just protons since atomic hydrogen does not have a neutron. This conversion occurs in the absence of elevated temperatures or pressures, so that the resulting output fluid 740 is suitable for shipping or storage at Standard Temperature and Pressure (STP, or Normal Temperature and Pressure NTP). One example period of reliable shelf-life of the output fluid 740 might be 36 months, although there could be examples of even longer shelf-life, depending on the specific formulation.

The input fluid 701 may be one of various commonly-found hydrogen-donating fluids or mixes of multiple hydrogen-donating fluids, and can also be dirty water, fracked water, and/or processed water. A non-limiting list of potential types of hydrogen-donating fluids can be found in an Appendix A to this disclosure, titled "EXAMPLE HYDROGEN-DONATING FLUIDS".

Figure 7B:
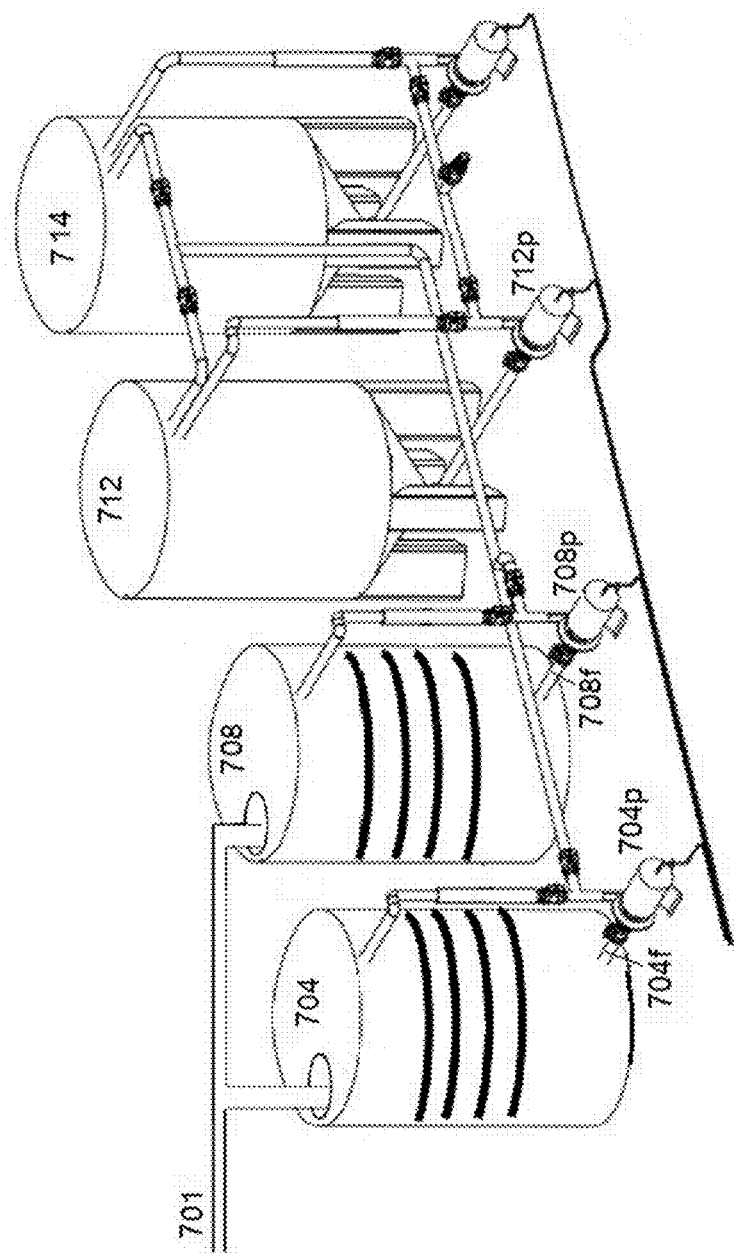

Referring to FIGS. 7A and 7B, the system 700 includes a first tank 704, a second tank 708, a third tank 712, and corresponding recirculators 704r, 708r, 712r. Both first and second tanks 704\708 comprise a recirculator 704r\708r, pump 704p\708p, and copper strands 704cs\708cs. Both first and second tanks also pump out fluid 704f\708f that has been processed and is on its way to becoming the proton rich atomic hydrogen output fluid 740. FIG. 7B shows a fourth tank 714 which acts as a potential overflow tank, or storage tank, or other way of assisting in management of output fluid 740 during or after a production run of thereof.

In some embodiments the tanks 704\708\712\714 may be formed from a poly material having a standard wall strength of 19 lb. The tanks 704\708 have the circumferential windings 704cs\708cs applied to their outer surface thereby forming a reaction zone. The windings 704cs\708cs can be formed with a 14-12 gauge copper stranded wire that is wrapped onto outer surface of the tank 704\708 and may be spaced away from the bottom, about e.g. 12 inches with a 2 inch spacing ending about e.g. 8 inches below the top.

The pumps 704p\708p can be threaded to receive a ball valve, e.g., Schedule 40 or 80, and can be liquid impeller pumps. Regardless of which type of pump, the pumps 704p\708p are coupled to the recirculators 704r\708r which have magnet-packs 1108 in various orientations attached thereto. The circumferential windings 704cs\708cs may be electrically coupled to a power supply 735 so as to be electrically coupled to either alternating or direct current.

A pre-determined wattage for the circumferential windings 704cs\708cs is selected based on the chemical constituents of the input fluid 701, a desired configuration of the output fluid 740, or other factor. As current moves through windings 704cs\708cs, a corresponding magnetic field directed perpendicularly to windings 704cs\708cs applies a magnetostatic force to liquid 701 while being recirculated through the tanks 704\708 for a predetermined period of time until the outlet fluid 704f\708f is transferred via e.g. the ball valves to the tank 712.

The magnetostatic forces applied to the windings 704cs\708cs can be adjusted between 2,000-80,000 Gauss, with 20,000-80,000 Gauss being a preferred range. Once a magnetic field setting is reached and a processing cycle has begun, it's typical to make no further adjustments. This is helpful not only for ensuring a steady magnetic field and magnetostatic force being applied to the input fluid 701, but also for optimal experimentation, accurate measurements.

When outlet openings 704f and 708f are opened, the fluids 704f\708f are combined into the third tank 712 which comprises a recirculator 712r and pump 712p. The tank 712 may be formed from a poly tank having a wall strength of e.g. 19 lb. Once the fluid from both first tank 704 and second tank 708 are combined into the third tank 712, the combination is pumped and recirculated within the third tank 712.

Unlike the first tank 704 or second tank 708, third tank 712 does not have a circumferential windings or copper strands, and therefore experiences no electrostatic effects. Instead, the third tank 712 experiences an oscillating magnetic field through the recirculator 712r due to the magnet-packs 1108 attached thereto.

Figure 13A:
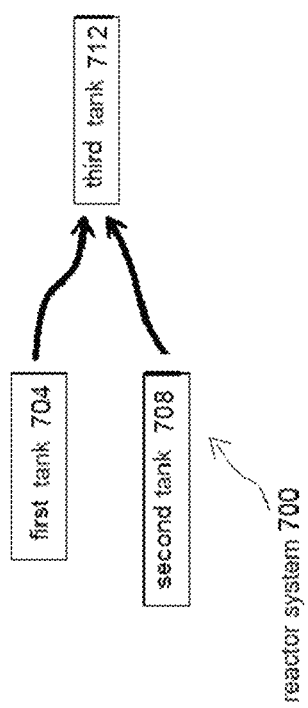
FIGS. 13-13B compare two different types of reactor systems.
Figure 13B:
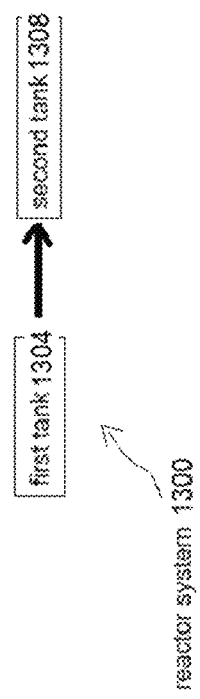

Potential alternate embodiments can include a 2-tank system 1300 rather than 3-tank system 700, as shown in the contrasting arrangements of FIG. 13A and FIG. 13B. Further, the recirculators 704r\708r\712r can have windings or electrical components located directly therein. For brevity and clarity, such windings or electrical components are not shown in any Figures.

Figure 8:
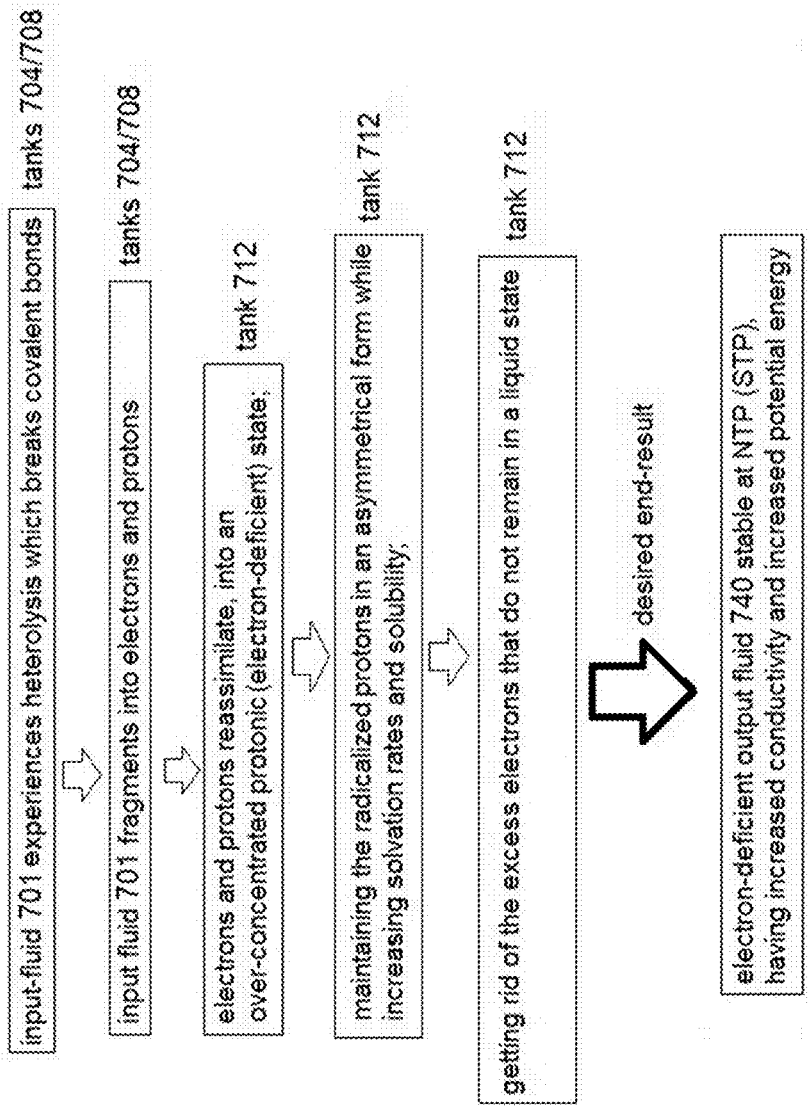
FIG. 8 is a flowchart of an overview of the various reactions that take place in the systems of FIGS. 7A-7B.
Figure 9:
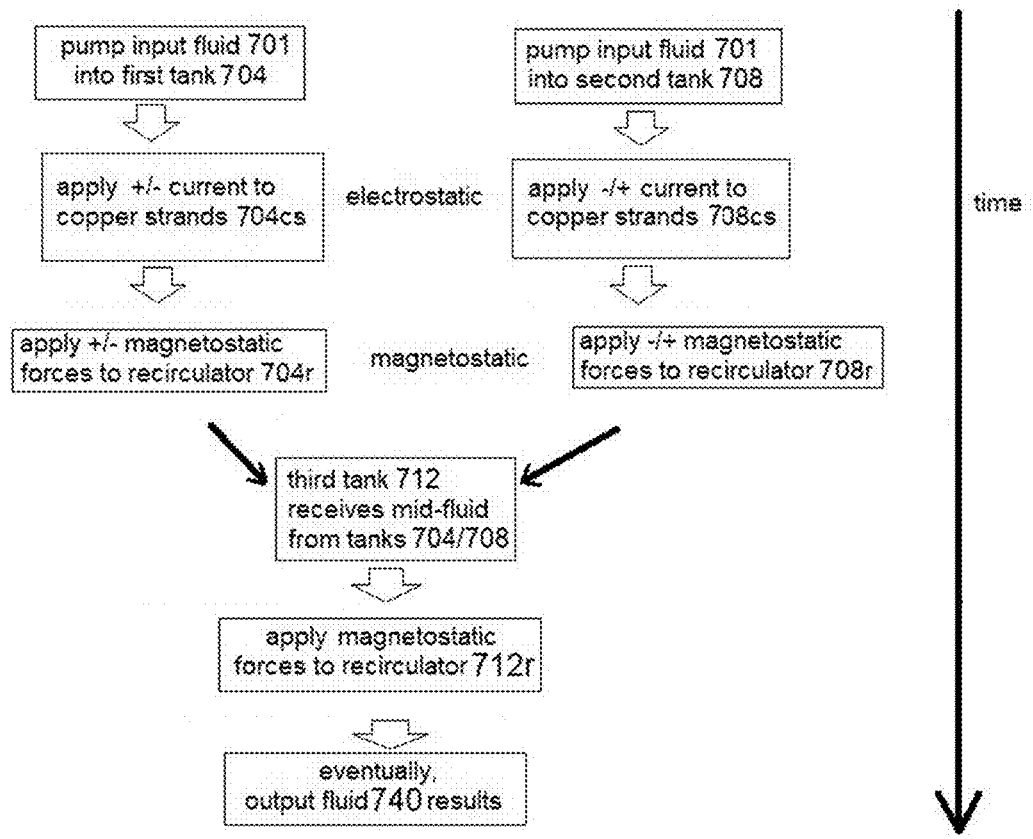
FIG. 9 is a flowchart of a step-by-step recitation of what happens at each stop along the way through the reactor system of FIGS. 7A-7B.
Figure 10:
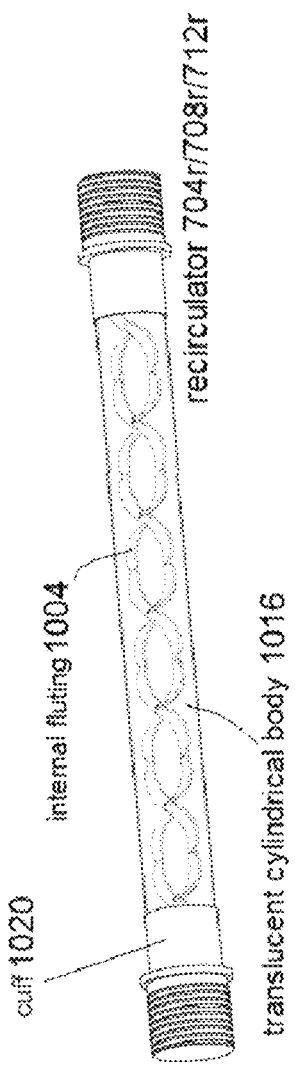

FIG. 8 is a flowchart of an overview of the various reactions that take place in the system 700. FIG. 9 is a flowchart of a step-by-step recitation of what happens at each stop along the way through the reactor system 700, including what happens in which of the three tanks 704\708\712. The flowcharts in FIGS. 8 and 9 address the same base reactor-process, but convey differing facts in different ways.

FIGS. 10, 11A, 11B, 12A, and 12B show detail of the recirculators 704r, 708r, and 712r, which are sometimes referred to as static mixers. As shown at least within FIG. 10, each recirculator can be formed as an elongated translucent tube 1016 that has internal fluting 1004 (AKA baffle) located therein. The recirculators 704r, 708r, and 712r further comprise a cuff 1020 at each end, along with threaded surfaces so that they may be connected in series. The internal fluting 1004 aids in restraining fluid flowing through the translucent tube 1016 thereby forming a type of reaction zone. Each internal fluting 1004 is often formed as a plurality of cuffs 1020 that can be concatenated to one another so as to form a chain structure.

Moving to FIG. 11A, within any particular recirculator, a plurality of magnets or magnet packs 1108 are arranged circumferentially about the outer surface of the tube 1016 and periodically located its length. In some embodiments, each magnet pack 1108 is formed with one or more static bar-magnets 1108 that define opposite polarities often denoted as a North and South.

Each magnet 1108 is arranged on an outer surface of the tube 1016 in specific ways. One example arrangement is where each North pole side may be facing e.g. radially inwardly, toward the center of tube 1016. In this arrangement, each South pole side of a magnet or magnet group 1108 would then face radially outwardly from an outer surface of the tube 1016. The specific size, shape, and orientation of the individual magnets 1108 can vary. FIG. 11B shows an example magnet 1108 having a non-domino shape, but that is for example only.

As shown in FIG. 11A, an embodiment of the recirculators 704r\708r\712r may be forty-eight inches in length with a plurality of circumferentially taped magnets or magnet groups 1108 positioned on outer surface beginning from about three inches from a first end of the tube 1016 so as to be periodically located along the length of tube 1016 to within six inches from a second end of the tube 1016. A plurality of circumferentially wrapped magnetic packs 1016 will provide a magnetostatic force that is applied to the input fluid 701, as discussed with regard to FIG. 9.

During use, a magnetic field is applied to the tanks 704t\708t. This magnetic field is often in the range of 2K-180K Gauss.

As shown in FIG. 8, in operation, input fluid 701 is piped into tanks 704\708 until at least partially filled. The tanks 704\708 will have a predetermined wattages applied through their respective circumferential winding 704cs\708cs for predetermined time periods, often at least 45 minutes. Often, current applied through the circumferential windings 704cs\708cs may be between 5-100 amps at a wattage between 60-1200 watts, with 100 amps at 1,000 watts being advantageous. The polarity of the current source supplying circumferential windings 704cs\708cs can be equal.

During use, the recirculating pumps 704p\708p move the input fluid 701 through the tanks 704\708 via the recirculators 704r\708r which apply a uniform static magnetic field to input liquid 701 via the magnets 1108.

A polarity applied to input liquid 701 through recirculator 704r may be opposite the polarity applied recirculator 708r. In one embodiment, recirculator 704r will be set with North pole sides facing radially inwardly applying a total of 46,000 Gauss to input liquid 701, while the recirculator 708r will be set with South pole sides facing radially inwardly thereby applying a total of 46,000-58,000 Gauss to the input liquid 701.

Continuing this example, constant recirculation of the input fluid 701 from the tanks 704\708 through recirculators 704r\708r causes a non-transitory polar imbalance in the input liquid 701. The differences in fluid velocities within recirculators 704r\708r thus creates a separation and segregation of atomic hydrogen within the input fluid 701.

The reactor system(s) 700 can be operated with a variety of ranges and thus have a lot of configurability and ability to be customized for specific types of production runs of the output fluid 740, and also can be adapted to specific types of input fluid 701. As stated, typically, the input fluid will be a hydrogen-donating fluid. Further, each of the first, second, and third recirculators can separately apply a pre-configured magnetic field to the fluid circulating therein, therefore creating a separate proton-rich vortex within each of the plurality of tanks 704\708\712. These pre-configured magnetic fields can be adjusted by changing and varying the magnet packs 1108 attached to the recirculators.

The activity within the reactor system(s) 700 result in removing electrons from the input fluid in such a way that the resulting output fluid becomes electron-deficient. This output fluid (AKA proton rich ionic fluid) 740 can remain electron deficient at STP for varying periods, in many configurations have a shelf-life of 36 months.

The circumferential windings 704cs\708cs can have a variety of voltages and currents applied thereto. The voltage applied to the windings 704cs may be equal to that applied to the windings 708cs, or may not. Further, a voltage may be applied to one set of windings but not the other, and polarity may be altered.

This ends the main discussion of the reactor system(s) 700, and the vaporizer 1400 will now be discussed.

Figure 14A:
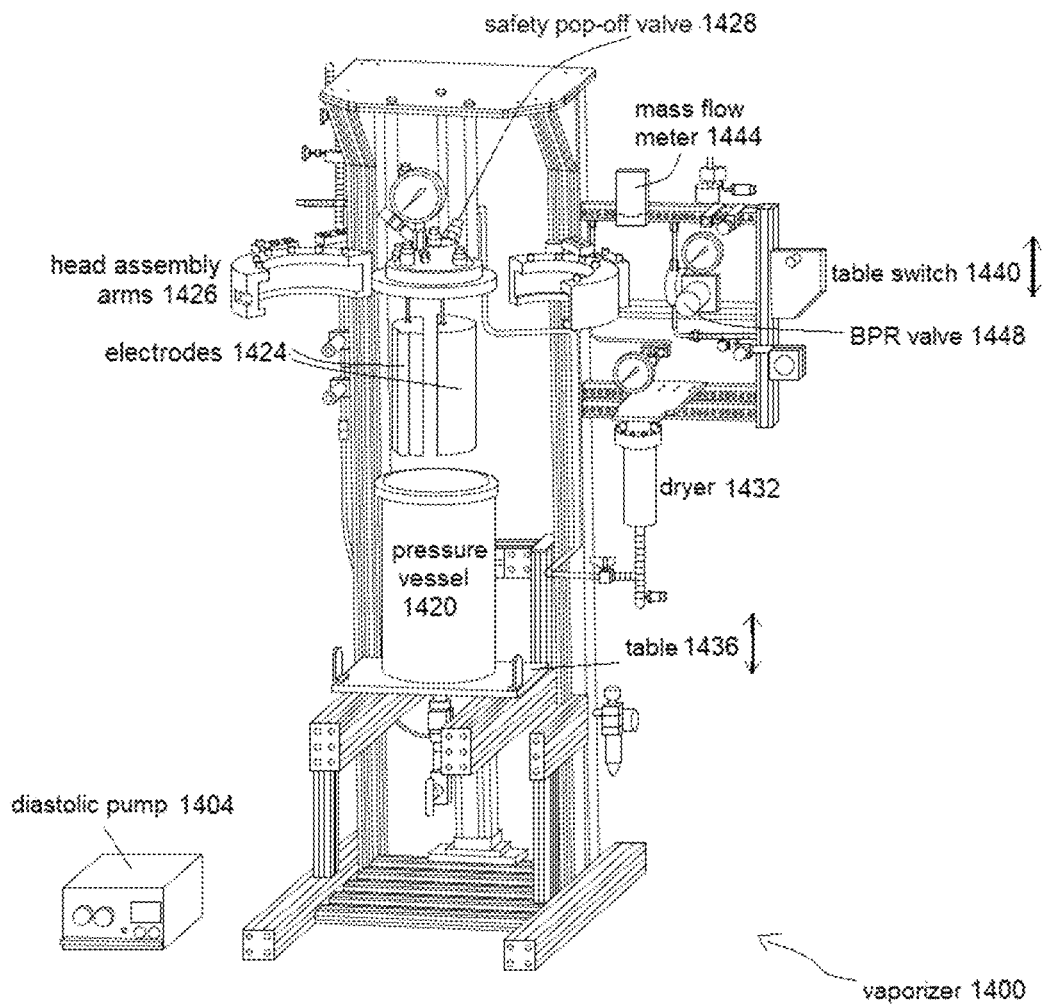
FIGS. 14A-14B show components of an example vaporizer from FIG. 7A.
Figure 14B:
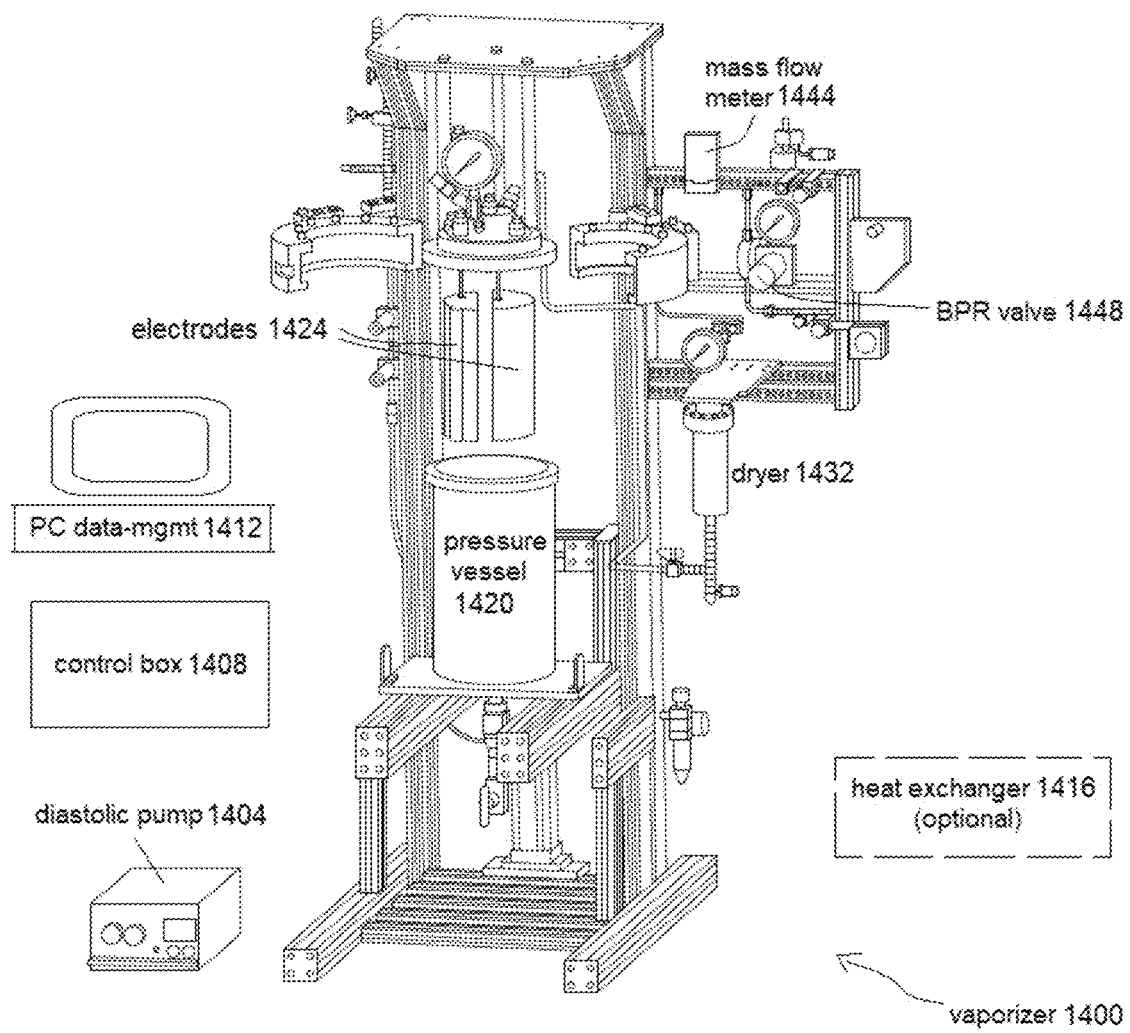

FIGS. 14A-14B show components of an example vaporizer 1400 alluded to at least within FIG. 7A. Some details of the vaporizer 1400 are split out over separate figures in order to avoid clutter and excess congestion in any single drawing. Also, FIGS. 14A-14B show the vaporizer 1400 in an open (non-use) position so that more components are visible. From FIGS. 14A-14B it is apparent that the vaporizer 1400 comprises a diastolic pump 1404 used in forwarding the proton-rich atomic hydrogen output fluid 740 into a pressure chamber 1420. Two or more electrodes 1424 act to assist in transforming the output fluid 740 from liquid state into a gaseous state.

The table 1436 acts to lift and move the pressure vessel 1420 into operating position, and is raised and lowered by the up-down table switch 1440. The pressure vessel 1420 is capable of sustaining chemical reactions at a wide variety of pressures, and thus is very durable and strong. An example range of potential pressures for the pressure vessel 1420 might be from 0 PSI to 12,000 PSI. Thus, the pressure vessel 1420 must be manufactured of very high durability components, and (during operation) is locked into position by the two head assembly arms 1426. In the event of an unexpected reaction, the safety pop-off valve (blowout cap) 1428 can release pressure if needed. In the event of a pressure overload, the safety pop-off valve 1428 operates to evacuate unexpected volumes of gas, thereby reducing the risk of explosions.

The vaporizer 1400 further comprises a dryer 1432, one or more mass flow meters 1444 (which can be located in a variety of positions within the path of the H2 gas being formed), and a Back Pressure Release (BPR) valve 1448. As the vaporizer 1400 is being used, it's possible to check and ensure proper operation by viewing information from the mass flow meter(s) 1444. Partly because the input fluid 701 may often start out as water-based, it's possible that some water will find its way into the vaporizer 1400. The dryer 1432 removes any such water, which in turn means the resulting H2 gas has a higher level of purity.

The BPR valve 1448 works with the specially-configured dryer 1432 to be in-line as part of the vaporization process, fully pressurized, so that the resulting H2 gas is ready to sell immediately (AKA retail-ready). In conventional vaporization, compression activities add moisture, which means additional drying must occur down-line from the compression, thus must occur later in some type of extra step. In sharp contrast, the arrangement of the vaporizer 1400 eliminates this problem. That is, the BPR 1448 working directly in-line with the dryer 1432 which means the vaporizer 1400 is more retail-ready. This in turn means the vaporizer 1400 working with the reactor system(s) 700 can provide retail-ready customer-ready H2 gas more quickly, in a wider variety of environments.

The BPR 1448 is helpful for adjusting amount of liquid volume within the pressure vessel 1420 being exposed to the electrodes 1424. The BPR valve 1448 provides thus retail-ready H2 gas at any pressure desired by any customer, without the need of an additional compressor or PRU (Pressure Reducing Unit).

The BPR valve 1448 is always positioned behind the pressure chamber 1420. Most other vaporization arrangements do not have in-line pressure adjustment within their H2 production arrangements. Instead, it is customary to use a second compressor. Unfortunately for these arrangements, pressure fluctuation can harm the effectiveness of the drying process, so it's best to avoid changing pressure during a drying process.

Conventional ways of producing H2 gas involve setting a compressor either to the SMR or electrolyzer output pressure so as to achieve a required customer pressure. That is, conventional H2 producers must use a compressor to prepare high-pressure canisters or containers e.g. 10K PSI (a common H2 customer requirement). Meanwhile, the embodiments of vaporizer 1400 discussed herein produce such containers, at the desired pressure e.g. 10K PSI, without an external compressor. Instead, the BPR 1448 can achieve pressures according to what a customer wants.

The vaporizer 1400 achieves high pressure gas production without the need of an additional compressor, thereby achieving high pressure retail-ready containers of H2 e.g. ranging between 300 PSI and 10K PSI.

In an embodiment, the BPR valve 1448 is a variable speed pump, AKA a variable gas valve, which can change the volume of gas with movement of a dial.

In an embodiment, one of the power conversion systems 100/300/400/500/600 is connected to the electrodes 1424. Volume of liquid is directly proportional to efficient power factor load. The embodiments herein can adjust a volume of liquid present in the pressure vessel 1420 according to a power factor reading from any of the power conversion systems 100/300/400/500/600 discussed herein.

The dryer 1432 operates at whatever pressure is determined by the BPR 1448. Thus, any outgoing pressure of the H2 gas can be adjusted to customer requirements using the BPR 1448, because the BPR 1448 is close to the dryer 1432.

The heat exchanger 1416 is an optional component which provides value by pulling out heat out (like a car radiator) of the pressure chamber 1420, or can be used to put heat in.

Next, operating the vaporizer 1400 is a complex task with a lot of moving parts and elements, often changing simultaneously. The control box 1408 works with a PC-dataMgmt product 1412 to display software menus and GUIs to assist the operator in making decisions.

APPENDIX A: EXAMPLE HYDROGEN-DONATING FLUIDS

A non-limiting list of potential types of hydrogen-donating fluids can include but is not limited to e.g., HCl—hydrochloric acid, HNO3—nitric acid, H2SO4—sulfuric acid, HBr—hydrobromic acid, HI—hydroiodic acid, HClO4—perchloric acid, HClO3—chloric acid, HO2C2O22H—oxalic acid, H2SO3—sulfurous acid, H2O—water, HSO4—hydrogen sulfate ion, H3PO4—phosphoric acid, HNO2—nitrous acid, HF—hydrofluoric acid, HCO2H—methanoic acid, C6H5COOH—benzoic acid, CH3COOH—acetic acid, HCOOH—formic acid, C6H8O7—citric acid, C18H36O2—stearic acid, CH3OH—methyl alcohol, CH3CH2OH—ethyl alcohol, CH3(CH2)3OH—n-butyl alcohol, C3H8O—propanol, CH3CH2CH2OH—n-propyl alcohol, (CH3)3COH—t—butyl alcohol, CH3(CH2)4OH—n-pentyl alcohol, and (CH3)2CHOH—isopropyl alcohol.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of configuring a power conversion system for providing AC power at sustainable current levels to a load containing a Proton-Rich Ionic Fluid (PRIF), comprising:
configuring a first tank for receiving and circulating a hydrogen-donating input fluid;
arranging a first recirculator and first pump into fluid communication with the first tank and circulating the input fluid within a first enclosed zone for a first predetermined duration;
outputting a first intermediate fluid to a third tank;
configuring a second tank for receiving the hydrogen-donating input fluid;
arranging a second recirculator and second pump into fluid communication with a second enclosed zone;
outputting a second intermediate fluid to the third tank;
configuring the third tank for receiving and circulating processed fluid from the first and second zones;
arranging a third recirculator and third pump into fluid communication with a third enclosed zone in the third tank;
forming the PRIF having a plurality of separated $H_1+$ protons therein;
outputting the completed PRIF from the third tank into a storage tank;
configuring an AC generator for supplying AC power to a DC module;
the DC module temporarily converting that AC power as DC and feeding that DC power to a buck converter;
the buck converter reducing a voltage level fed into an AC module;
a load sensor maintaining a level of current to a set predetermined range;
the load sensor ensuring current flow stays within predetermined set boundaries;
the AC module restoring the converted power back to AC so as to supply stabilized AC current at a set of output terminals located therein using the AC generator; and
the output terminals being connected to the load in the form of an electro-chemical reforming device containing a predetermined amount of the PRIF having the plurality of $H_1^+$ protons, wherein the load reforms the $H_1^+$ protons into $H_2$ gas.

2. The method of claim 1, further comprising:
in instances of low or zero impedance, the load sensor continuing to supply predetermined non-changing amounts of current to the electro-chemical reforming device yet ensuring the system not shutting off or overloading; and
the load sensor making determinations about the load and assisting in making adjustments to ensure a steady known predetermined amount of current that does not change regardless of changes in load impedance.

3. The method of claim 2, further comprising:
arranging an inductor, diode, and a high-frequency switching MOSFET to function as the buck converter; and
configuring a set of control logic elements for managing the buck converter.

4. The method of claim 2, further comprising:
arranging two high-frequency switching MOSFETs in the format of a totem pole arrangement, thereby forming the buck converter in the form of a synchronous buck converter;
one or more control logic blocks controlling a line-frequency switching function of the switching MOSFETs.

5. The method of claim 4, further comprising:
configuring the high-frequency electronic switches to be polarity agnostic, thereby facilitating working with AC voltages and currents.

6. The method of claim 5, further comprising:
the buck converter reducing the DC voltage while stabilizing an amount of DC current passed onto the next stage.

7. The method of claim 2, further comprising:
configuring the load sensor to ensure the system supplies A/C current that does not surpass a first predetermined amount and also does not go below a second predetermined amount of A/C current; thereby
ensuring the system acting both as a A/C current limiting device but also as a A/C current guaranteeing device.

8. The method of claim 7, further comprising:
configuring the power conversion system to have four diodes Q1-Q4 in a full-wave rectifier bridge modality and with four active switches Q5-Q8 acting as the buck converter;
configuring the load to have two ends and be operable by actively switching the two ends of the load such that the successive DC pulses output from the full-wave rectifier are applied to the AC restoration module,
the AC restoration module taking the successive DC pulses and restoring them into AC current and passing that AC current to the load;
the load properly interpreting these restored DC pulses as AC current.

9. The method of claim 2, further comprising:
the load sensor ensuring that current supplied to the load will never go below a certain limit thereby acting as a current-guaranteeing device.

10. The method of claim 1, further comprising:
arranging the electro-chemical reforming device to comprise electrodes or electrolytic cells for nucleating the PRIF into a hydrogen gas $H_2$; and
configuring the system so that as current is entering the electrodes, nucleation of the PRIF begins.

11. The method of claim 1, further comprising:
the enclosed zones removing electrons from the input fluid in such a way that the PRIF becomes electron-deficient.

12. The method of claim 11, further comprising:
subjecting the first recirculator to a first magnetic field from a first magnetic module attached to the first recirculator;
subjecting the second recirculator to a second magnetic field from a second magnetic module;
subjecting the third recirculator to a third magnetic field using a third magnetic module attached to the third recirculator for a third predetermined time period;
configuring the magnetic modules according to predetermined criteria; and
during the production process, adjusting the magnetic modules according to pre-configured criteria so as to achieve a desired formulation of output fluid.

13. The method of claim 12, further comprising:
a first portion of the buck converter pulling up with each half-cycle of the applied AC power and a second portion of the buck converter that pulling down with the other half-cycle.

14. The method of claim 12, further comprising:
applying the first and second magnetic fields to the input fluid for a predetermined period of time while recirculating the input fluid through the first and second tanks.

15. The method of claim 12, further comprising:
the third magnetic field being an oscillating magnetic field onto the fluid contained within the third tank, using magnet-packs.

16. The method of claim 12, further comprising:
arranging a section of internal fluting within the first, second, and third recirculators for restraining fluid flowing through the recirculators thereby forming a reaction zone.

17. The method of claim 12, further comprising:
arranging that a polarity applied to input fluid flowing through the first recirculator may be opposite the polarity applied the second recirculator.

18. The method of claim 12, further comprising:
creating a separate proton-rich vortex within each of the first, second, and third tanks.

19. The method of claim 1, further comprising:
constant recirculation of the input fluid from the first and second tanks through the first and second recirculators causing a non-transitory polar imbalance in the input liquid along with achieving differences in fluid velocities within the first and second recirculators, thereby
creating a separation and segregation of atomic hydrogen within the input fluid.

20. The method of claim 1, further comprising:
the hydrogen-donating input fluid being water-based.

21. The method of claim 1, further comprising:
the reactor system removing electrons from the input fluid in such a way that the resulting output fluid becomes electron-deficient and proton-rich.

* * * * *